United States Patent [19]

Oda et al.

[11] 4,122,015
[45] Oct. 24, 1978

[54] FORTIFIED METAL FILTER AND ITS PREPARATIVE PROCEDURE

[75] Inventors: Takashi Oda, Hirakata; Kaoru Kokubu, Sakai, both of Japan

[73] Assignee: Nippon Seisen Co., Ltd., Japan

[21] Appl. No.: 803,664

[22] Filed: Jun. 6, 1977

[51] Int. Cl.² .............................................. B01D 39/14
[52] U.S. Cl. ..................................... 210/496; 55/526; 210/510
[58] Field of Search .................... 210/496, 499 R, 510; 55/523, 525, 526

[56] References Cited

U.S. PATENT DOCUMENTS

| 3,690,606 | 9/1972 | Pall | 210/510 X |
| 3,693,750 | 9/1972 | Takkunen | 210/510 X |
| 3,780,872 | 12/1973 | Pall | 210/510 X |

Primary Examiner—William A. Cuchlinski, Jr.
Attorney, Agent, or Firm—Basile and Weintraub

[57] ABSTRACT

A fortified metal filter possessing a high filtering efficiency, a large pore ratio and a wide net area of fused parts of fine stainless steel wires is prepared by crushing the edges of these wires. The wires utilized in the system are composed of numerous polygonally cross-sectioned fine stainless steel wires. The procedure for preparing such filters, in which only the fused part, which arises from the crushing of the wire edges, possesses a large net area and the metal is diffused into the fused part, is achieved by heating and compressing the system simultaneously.

8 Claims, 12 Drawing Figures

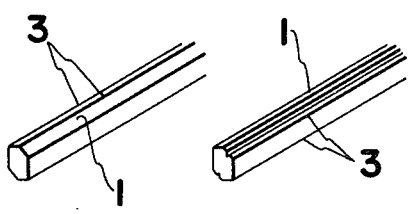
FIG. 1
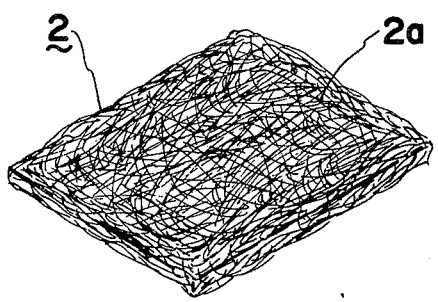
FIG. 2A
FIG. 3
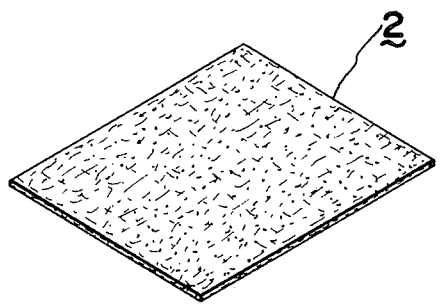
FIG. 2B
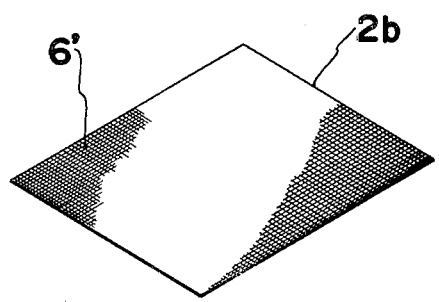
FIG. 4
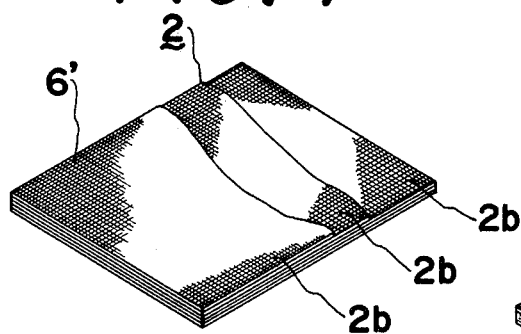
FIG. 5
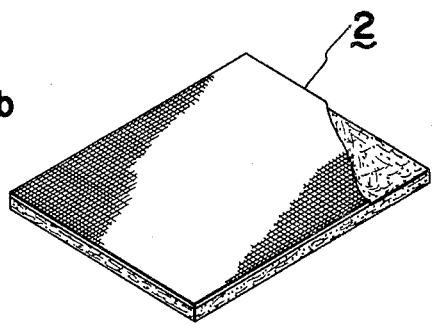

FORTIFIED METAL FILTER AND ITS PREPARATIVE PROCEDURE

BACKGROUND OF THE INVENTION

1. Field of the Invention

The present invention concerns a method for preparing a fortified metal filter in which the pore ratio is precisely controlled, and the filter so-produced.

2. Prior Art

There is presently known a filter material which is obtained by first compressing and, then, sintering a web-like system of numerous fine metal wires or by sintering a metal powder. In particular, the filter material obtained by compressing the web-like system of fine metal wires has been widely applied because of its large pore ratio and strength compared to the filter material obtained from a metal powder.

Irrespective of the widespread growth of the filter material, the web-like filter material can still be improved upon, if the following can be achieved:

(1) A high filter efficiency and sufficiently large pore ratio can be maintained by compression;

In general, the filter efficiency is inversely proportional to the pore ratio due to the production techniques utilized. A filter material which satisfies both of these requirements can not be produced by the conventional methods.

(2) The fusion strength of the sintered part can be substantially maintained;

A filter often causes exfoliation in the sintered part reducing the pore ratio and filter efficiency. Since this is not desirable for most purposes, a high strength is required in the sintered part. However, unlike filters prepared from powdered metal, sufficient fusion between wires cannot be attained regardless of the orientation and compression of each wire in the filter of fine metal wires.

(3) The ease with which the pore ratio of the product is controlled;

According to the conventional procedures, the pore ratio of a filter is controlled by the degree of compression. But the pore ratio is not sufficiently altered by the degree of compression employed. Consequently, the pore ratio of the commerical product thus far available is not controlled accurately. The control of the pore ratio is necessary for evaluating the efficiency of a comparatively accurate filtering device.

(4) A simpler method for producing the product;

The conventional methods for producing the filters hereof employ repeated compression after annealing. This is the procedure that has been used to control the pore ratio and the filtering efficiency of the product. However, if compression and annealing are not performed simultaneously, as seen in this case, not only is the heat efficiency low, but the diffusion of metal in the fused part is prevented by inefficient heat transfer and repeated heating compression. This occasionally causes a region of heterogeneity arising from massive fusion parts in the system.

(5) Control of free particles arising from repeated heating compression.

SUMMARY OF THE INVENTION

The present invention gives a solution to the above-mentioned problems concerning the preparative procedure of the filter material obtained by simultaneous compression and sintering of a mass of fine metal wires.

Accordingly, the present invention provides a fortified metal filter in which pore ratio is accurately controlled. Such a metal filter, whose pores are constructed by metal-metal diffusion between the fused planes having sufficiently large area within the contact area between the edges of fine metal wires, is made of a web or network of fine stainless steel wires, the cross-sections of which are polygonal.

Strengthening of the filter and control of the pore ratio are performed by simultaneously compressing and heating the fine metal wire network. This, also, specifies the pore radii to be a function of pressure, alone.

The salient feature of the present manufacturing procedure is the process of simultaneous compression and heating without repeating these processes alternately. This new technique eliminates excess fusion of pores formed in the metal wire network and represses the formation of free particles arising from the bending or breakage of wires. Furthermore, although the processing is simple, sufficient metal-metal fusion is attained.

Thus, the present invention provides:

(a) Preparation of a fortified filter material having a large pore ratio using fine metal wires;

(b) Preparation of a filter material with a large pore ratio and high filtering efficiency;

(c) Preparation of a homogeneous filter material of good quality;

(d) A production method which can control accurately the pore ratio of the filter material;

(e) A simple procedure to prepare filter materials, and (f) A procedure for preparing filter materials with high heat efficiency and of good quality.

For a more complete understanding of the present invention reference is made to the following detailed description and accompanying drawing. In the drawing like reference characters refer to like parts throughout the several views, in which:

BRIEF DESCRIPTION OF THE DRAWINGS

FIG. 1 is a perspective view of typical fine stainless steel wires employed in the practice of the present invention;

FIG. 2A is a perspective view of a web-like mass of stainless steel wires utilized herein;

FIG. 2B depicts a network of regularly oriented stainless steel wires in accordance herewith;

FIG. 3 is a perspective view of a filter material obtained by heating and compressing the masses shown in FIGS. 2A and 2B;

FIG. 4 is a perspective view, partially in cross section, of a filter material obtained by heating and compressing the mass which is obtained by accumulation of the network shown in FIG. 2B;

FIG. 5 is a perspective view, partially in cross section, of a filter material obtained by heating and compressing the cotton-like mass of the network depicted in FIG. 2A;

DETAILED DESCRIPTION OF THE PREFERRED EMBODIMENT

Figure 6A:
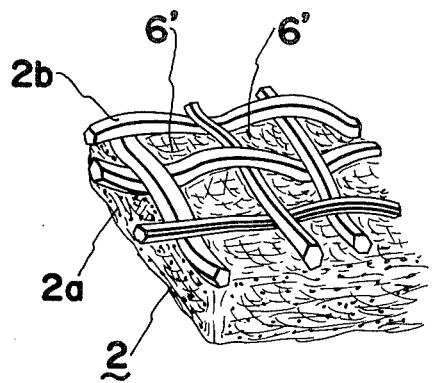
FIG. 6A is a perspective, partial, expanded view of a combined system of a web and a network of fine stainless steel wires.

According to the present invention, the web mass of FIG. 2A and the accumulated layers of FIG. 4, from the network of FIG. 2A are prepared from polygonally cross-sectioned fine stainless steel wires 1. A fortified metal filter having a large pore ratio is obtained by the metal-metal fusion between the edges 3 of the fine wires 1 which are actually in contact with each other. In order to obtain the filter material hereof, the material 2, comprising fine stainless steel wires 1 is heated under a non-oxidative or inert atmosphere or under a high vacuum 4.

While being heated, the whole mass is uniformly compressed. This process guarantees the formation of a large area of metal-metal fusion between the edges 3 of fine wires which are actually in contact at points P. The whole material is solidified upon cooling to provide significant metal diffusion between metal wires at the planes in actual contact.

Further utilization of the fundamental method can be found in a combination of a web 2a and a network 2b followed by uniform compression while applying heat under inert atmosphere.

In a similar fashion, the edges 3 of fine wires 1 in actual contact at points P are fused to provide a large area of fusion as well as a uniform contraction of the network 2b. The system in which metal-to-metal fusion takes place at the actual contact point P of fine wires 1 is then cooled. This provides a fortified metal filter material whose pores are uniformly distributed over its surface.

With more particularly, FIG. 1 illustrates an expanded drawing of the typical stainless steel fine wires having a polygonal cross-section. A plurality of these wires are employed for the production of a fortified metal filter in accordance herewith. These stainless steel wires are so fine that they could be called "fibers." For example, those having $4\mu$–$30\mu\phi$ would be most appropriate. The fine wires may have any polygonal cross-section such as, hexagonal, pentagonal, as well as irregular convex polygons. By providing a polygonal cross-section, the wires consequently, have edges 3 extending therealong.

A plurality of the fine stainless steel wires 1 are collected by any known process to form either material 2 as shown in FIGS. 2A and 2B. FIG. 2A depicts an irregular web-like system 2a formed from the fine wires 1 and FIG. 2B illustrates a fine regular network system 2b produced likewise from the wires 1.

In the present invention, therefore, the system 2 refers to either of the two systems, 2a or 2b. However, a single layer 2b is not contemplated as being within the present invention.

After the systems 2 are formed, and to prepare the present filter material, the systems 2 are inserted in a particular furnace 5 and, then, subjected to thermal compression. The furnace 5 is filled with an inert gas, such as argon, prior to heating, or is at least degassed or purged with the inert gas. A heating device 7 is employed to enable the temperature to be maintained at 900° C. The system 2 is disposed on the furnace bed 5a and then compressed with a flat weight 5b.

China, ceramic or metals possessing higher melting points than that of the stainless steel systems 2 are used for the furnace bed 5a. The same higher melting point material is used, also, for the weight 5b.

As noted heretofore, the dominant feature of the present invention resides in the fact that heat and compression are applied simultaneously in the same furnace to the system 2. For this reason, the period and the level of compression are both important, and they, in turn, are determined by the physical properties of the system 2, disposed on the bed 5a.

For example, about 20 kg/m$_2$ is suitable as the pressure for weight 5b when applied to a web made of the fine stainless steel wires having an apparent volume of about 5~20mm × 1000mm × 1000mm with a pore ratio of 99%.

When this amount of pressure is applied to the defined web the volume of the web is reduced to about 30% of its initial volume, in the direction of its thickness, and the pore ratio is, also, reduced to 70% of its original measurement. Further compression at 30 kg/m$_2$ on the same material evidenced a reduction of its volume and pore ratio to about 75% and 61%, respectfully. These experimental results suggest that the pore ratio substantially changes by the pressure applied to the material 2.

Therefore, it is apparent that the pore ratio can be readily controlled by and is a function of the pressure applied to the material 2. This is because the present invention employs simultaneous heating and compression applied to the material 2 instead of the conventional method in which heating and compression are alternately repeated and because the cross-section of the starting material employed in this invention is polygonally shaped. This latter aspect offers flexibility of the edges 3 upon the compression thereof.

It should be noted with respect hereto that the period of thermal compression can vary and need only ensure that metal-to-metal fusion takes place between the wires in actual contact.

Another experimental example of the present invention involves the use of cumulative layers of a network 2b. The network comprises stainless wires 1 of 8 and having the same cross-section as described above. In this case, the compression ratio is at most 10%, but the pore ratio is decreased from 80% to 68%. As heretofore noted the pore ratio is a function of the applied pressure.

The system 2, comprising cumulative layers of network 2b, offers the advantage that the control of the pore ratio can be accomplished to a high degree since the mesh of the network 2b can be determined prior to compression.

Hence the system 2 is turned into the filter material as shown FIGS. 3–5 by thermal compression in the furnace 5.

The filter material shown in FIG. 3 is obtained by thermal compression of the web 2a of stainless steel wires 1. The filter material shown in FIG. 4 is obtained by thermal compression of the cumulative layers of network 2b shown in FIG. 2B. FIG. 5 shows the filter material obtained by thermal compression of a combined system of 2a and 2b.

Figure 7A:
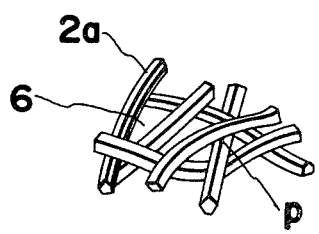
FIG. 7A is a perspective, expanded view of the web of FIG. 2A.
Figure 7B:
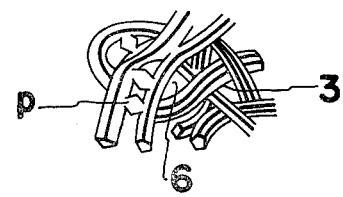
FIG. 7B is a perspective, partial, expanded view of the filter tissues obtained by compression and heating of the material of FIG. 3.

As shown in FIG. 7A, the web 2a, before thermal compression, has a large pore or area 6 formed in the fine wires 1. The large area 6 is in contact with the edge 3 of wire 1 and the area occupied by the surrounding planes of wire 1 is small. However, upon thermal compression the wire 1 in actual contact with edge 3 is crushed to provide metal-to-metal fusion at the point of contact P, as seen in FIG. 7B. Although a contraction of pore 6 is unavoidable by this fusion process, a complex maze is formed by the edges 3 which remain unfused within pore 6. This assures sufficient filtering efficiency of the product.

Contraction of pore 6 arises mainly from the fusion between wires 1 and the above-mentioned edges 3.

Figure 8:
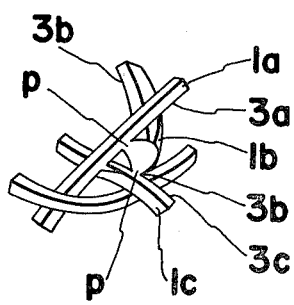
FIG. 8 is a further expanded view of the subject matter depicted in FIG. 7B.
Figure 9:
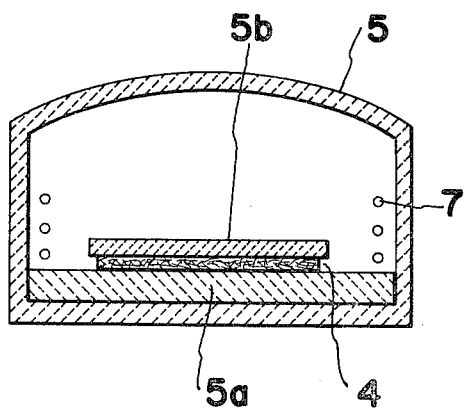
FIG. 9 is a side elevational, schematic drawing of a furnace utilized to perform the process of the present invention.

The fusion at point P where the wires are in contact and the results of the metal-to-metal diffusion at the points are explicitly shown in FIG. 8. As shown in FIG. 8 wires 1a, 1b, and 1c are in contact at point P where edges 3a, 3b and 3c are crushed to form a large area of fusion.

Such a large area of fusion and the metal-to-metal diffusion at P where edges 3 and other wires 1 are in contact takes place, also, in the system of cumulative layers shown in FIGS. 4 and 5. In particular, in the filter material obtained by thermal compression of the cumulated system of network 2b, chances of fusion are less than that in the filter prepared from the web 2a. However, the fusion on edge 3 of wire 1 and a large area of metal-to-metal diffusion provide a sufficient degree of sintering.

Figure 6B:
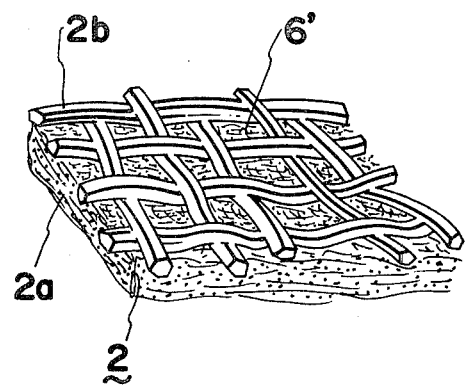
FIG. 6B is a perspective, partial, expanded view of the surface of a filter material prepared from the material shown in FIG. 6A.

As noted, FIG. 5 shows the filter material obtained by thermal compression of cumulative layers of web 2a and network 2b. In FIGS. 6A and 6B there is shown the material of FIG. 5 before and after thermal compression, respectively. As shown in FIG. 6A, fine wires 1 form a network which is located on top of web 2a. The meshes of the network are relatively large. In FIG. 6B after thermal compression, fusion of wires 1 takes place to a certain degree and contributes to the contraction of the meshes of pore 6. Expectedly, the area where web 2a and network 2b are in contact along edges 3 provide a filter of good quality. Also, a further filter material can be prepared by sandwiching web 2a between first and second spaced apart networks 2b.

Having, thus, described the invention what is claimed is:

1. In a method of preparing a filter of the type comprising a plurality of fine wires having a polygonal cross-section with an area of fusion between the wires at the points of contact therebetween, the improvement which comprises:
    (a) heating the plurality of wires in a furnace,
    (b) simultaneously with the heating, compressing the wires to create a fusion between the wires at the points of contact therebetween, and
    (c) thereafter, cooling the heated and compressed wires.

2. The improvement of claim 1 wherein:
the wires are stainless steel wires.

3. The improvement of claim 2 wherein:
the wires are heated and compressed in an inert atmosphere.

4. The improvement of claim 2 wherein:
the wires are heated and compressed under vacuum.

5. The improvement of claim 2 wherein:
the plurality of wires are disposed in overlying first and second arrays, the first array being defined by a plurality of layers of the wires, each layer comprising a regular network of interwoven wires, and the second array being defined by an interwoven irregular web.

6. The improvement of claim 5 which further comprises:
a third array, the third array being defined by a plurality of layers, each layer comprising a regular network of interwoven wires, and
wherein the second array is sandwiched between the first and third arrays.

7. The improvement of claim 1 wherein:
the furnace is maintained at a temperature of about 900° C.

8. The improvement of claim 1 wherein:
the wires are compressed at a pressure of from about 20 kg/m² to about 30 kg/m².

* * * * *